Patented Apr. 13, 1948

2,439,489

UNITED STATES PATENT OFFICE 2,439,489

PREPARATION OF SILVER FOIL

Fritz Rosenthal, Bellmawr, N. J., assignor to Radio Corporation of America, a corporation of Delaware No Drawing. Application June 26, 1944, Serial No. 542,250

3 Claims. (Cl. 204—12)

The present invention relates to the making of silver foil and more particularly to the making of a foil useful in capacitors for high-frequency apparatus.

It has been found highly desirable, in the design of capacitors which are to be used especially in high frequency apparatus, to employ conductive foils of silver or the like having a thickness of the order of about 0.00010 to 0.00015 inch in thickness. Heretofore, a mechanical rolling process has been employed for the production of thin foils, but the thinnest silver foil which it has been found practical to produce by mechanical processes has been approximately 0.0005 inch. I have found that extremely thin foils or sheets of silver can be formed by chemical deposition on polished or planished sheets of plastic material, and that such thin silver deposits do not adhere strongly to the plastic sheets and can be pulled off with as little force as the bond of adhesive tape applied thereover. However, the strength of a chemically deposited silver layer which ranges between 30 and 200 m$\mu$ in thickness is not very resistant to mechanical handling but tears rather readily. I have found, further, however, that if a layer of silver is electrodeposited upon the chemically deposited silver layer, the resulting combined silver layer can be removed from the plastic sheet without danger of tearing.

Some of the objects of the present invention are: to provide an improved silver foil; to provide a silver foil which is resistant to wear and tear in the ordinary handling operations; to provide a process by which a silver foil can be removed from a polished or planished plastic sheet without danger of tearing the foil product; to provide, as a step in the process of making silver foil, the electrodeposition of silver onto a plastic sheet that has been made conductive by a layer of chemically deposited silver; and to provide other improvements as will hereinafter appear.

In carrying out the process of the present invention, sheets of material have been selected from the group consisting of vinyl copolymer, styrene-coated cellulose acetate, and ethyl cellulose sheets ranging from about 0.010″ to about 0.020″ in thickness, though this specified thickness is not critical. It is important that the surface of the sheet be of extreme smoothness because dented, scratched or roughened areas so increase the adhesion of the silver deposit as to render stripping practically impossible. The sheet so selected is chemically silvered by any well-known process such as the Brasheer, formaldehyde and Rochelle salt methods. The silver layer deposited by the selected chemical deposition method is now used as the cathode in an electrolytic bath in which a current density having a range between one and eight amperes per square foot is used. Very satisfactory results are obtainable by a density of six amperes per square foot with a time element of ten to fifteen minutes. During the electro-deposition, stresses develop in the silver which cause the edges to begin to detach themselves from the plastic sheet. When this occurs the sheet is removed from the bath, rinsed carefully, preferably in distilled water, and the silver foil then stripped off the plastic sheet without danger of tearing. In some instances the stripping is done under water, as thereby electrostatic forces are eliminated which sometimes tend to complicate the stripping process. Thorough rinsing with water immediately after removal from the bath is important.

After stripping from the plastic sheet, the silver foil may be coated with polystyrene by applying it in a dilute solution by dipping, spraying or brushing. As an alternate, the polystyrene coating may be applied to the silver foil prior to stripping from the plastic sheet. Polystyrene-coated silver foil is useful in high-frequency apparatus, such as capacitors.

It will now be apparent that a novel process has been devised whereby a silver foil is produced thinner than heretofore attainable by known methods and of the order of 0.00010″ thickness. Furthermore, while produced in association with a plastic sheet, the foil is removable therefrom without danger of tearing and other damage. The plastic sheet forming the base for the silver is of a material selected from the group consisting of ethyl cellulose, styrene-coated cellulose acetate, vinyl copolymer and certain others of the resin group.

I claim as my invention:

1. The method of making silver foil having a thickness of 0.00010 to 0.00015 of an inch, which consists in chemically depositing silver upon a polished resinous plastic sheet ranging from 0.010 to 0.020 in thickness, electrodepositing silver upon the chemically deposited layer, rinsing the sheet, and stripping the silver foil from the plastic sheet.

2. The method of making silver foil having a thickness of 0.00010 to 0.00015 of an inch, which consists in chemically depositing silver upon a polished resinous plastic sheet ranging from 0.010 to 0.020 in thickness, electrodepositing silver upon the chemically deposited layer, rinsing the sheet, and stripping the silver foil from the plastic sheet while under water.

3. The method of making silver foil having a thickness of about 0.00010 to 0.00015 of an inch, which consists in chemically depositing silver upon a resinous polished plastic sheet of a thickness ranging from about 0.010 to about 0.020 of an inch, electrodepositing silver upon the chemically deposited layer, rinsing the sheet, and stripping the silver foil from the plastic sheet.

FRITZ ROSENTHAL.

REFERENCES CITED

The following references are of record in the file of this patent:

UNITED STATES PATENTS

| Number | Name | Date |
| --- | --- | --- |
| 1,056,641 | Demel | Mar. 18, 1913 |
| 1,535,916 | Halvorson | Apr. 28, 1925 |
| 1,580,198 | Harrison | Apr. 13, 1926 |
| 1,759,099 | Dake | May 20, 1930 |
| 2,203,283 | Miller | June 4, 1940 |
| 2,305,050 | Wise | Dec. 15, 1942 |
| 2,355,933 | Weiss | Aug. 15, 1944 |

FOREIGN PATENTS

| Number | Country | Date |
| --- | --- | --- |
| 1196 | Great Britain | 1852 |
| 261,592 | Great Britain | Nov. 25, 1926 |
| 432,095 | Great Britain | July 19, 1935 |

OTHER REFERENCES

Electrodeposition of Metals, by George Langbein, translated by W. T. Brannt, published by H. C. Baird and Co., New York, 1924. Page 196.